United States Patent [19]

Cornelius et al.

[11] 4,101,376
[45] Jul. 18, 1978

[54] TUBULAR HEATER FOR CRACKING HYDROCARBONS

[75] Inventors: Gerhard Cornelius, Bergen-Enkheim; Heinz Jockel, Klein-Gerau; Hans Küpfer, Frankfurt am Main, all of Fed. Rep. of Germany

[73] Assignee: Metallgesellschaft Aktiengesellschaft, Frankfurt am Main, Fed. Rep. of Germany

[21] Appl. No.: 724,125

[22] Filed: Sep. 17, 1976

Related U.S. Application Data

[63] Continuation of Ser. No. 552,507, Feb. 24, 1975, abandoned.

[30] Foreign Application Priority Data

Mar. 18, 1974 [DE] Fed. Rep. of Germany ....... 2412840

[51] Int. Cl.² .............................................. G21C 1/00
[52] U.S. Cl. .................... 176/39; 23/288 M; 252/373; 423/653
[58] Field of Search ............................ 176/39, 38, 37; 23/288 M, 288 A; 423/653; 48/212

[56] References Cited

U.S. PATENT DOCUMENTS

| 1,812,341 | 6/1931 | Jaeger ................................. 23/288 A |
| 2,173,984 | 9/1939 | Shapleigh ............................. 423/653 |
| 3,424,695 | 1/1969 | Wiesenthal ............................ 48/212 |
| 3,865,555 | 2/1975 | Elebracht et al. ................. 23/288 M |
| 4,005,045 | 1/1977 | Haese ..................................... 176/39 |

FOREIGN PATENT DOCUMENTS 15,376   8/1967   Japan ..................................... 176/39

*Primary Examiner*—Samuel W. Engle
*Assistant Examiner*—Ralph Palo
*Attorney, Agent, or Firm*—Burgess, Dinklage & Sprung

[57] ABSTRACT

A reactor for reacting hydrocarbons with steam to produce carbon monoxide and hydrogen containing gases in the presence of a catalyst contained in a reaction tube and indirectly heated by heating fluid which is a gas that has been used to cool a nuclear reactor. The reaction tubes are surrounded by the heating fluid over a portion of their length in a heating zone and the other portion thereof is positioned outside of the heating zone. The reaction tubes are provided with one or more conduits for feeding of reactants and one or more conduits for discharging product gas.

8 Claims, 2 Drawing Figures

TUBULAR HEATER FOR CRACKING HYDROCARBONS

This is a continuation of application Ser. No. 552,507, filed Feb. 24, 1975, now abandoned.

BACKGROUND

This invention relates to a reactor for reacting gaseous or vaporized hydrocarbons with water vapor to produce carbon monoxide-and hydrogen-containing gases at temperatures above 700° C and under pressure of 5–80 kg/cm² over catalyst material contained in reaction tubes, which are indirectly heated by a heating fluid which consists of a gas that has been used to cool a nuclear reactor, particularly helium, and is at a temperature above 800° C.

It is known that heat which has been produced by nuclear fission can be dissipated in a nuclear reactor by a gas, particularly helium. In such nuclear reactors the cooling helium is heated in most cases above 800° C to about 1100° C. The helium temperatures are preferably about 850°–1100° C. The helium leaving the reactor is under a pressure of about 20–60 kg/cm².

This invention utilizes the sensible heat of the helium in a tubular heater for cracking hydrocarbons. Such tubular heater contains catalyst material in indirectly heated tubes, through which the gaseous or vaporous hydrocarbons to be reacted are passed together with water vapor. Hydrocarbon feedstocks may consist, e.g., of natural gas, which consists mainly of methane, or of mixtures of methane and higher hydrocarbons, hydrogen and carbon oxides. Hydrocarbons which have higher boiling points than methane may also be reacted if they are transformed into vapor before. A rich gas produced from vaporized hydrocarbons may also be used as a feedstock. The catalysts are in many cases high activity nickel catalysts, which contain about 5–20% by weight nickel on a heat-resisting support, such as alumina.

SUMMARY

The reactor according to the invention comprises reaction tubes which are surrounded by the heating fluid in part of their length whereas the other part is disposed outside the heating zone and provided with one or more conduits for discharging the product gas. As a result, the feedstock entering the tubes is preheated by an indirect heat exchange with the leaving product gas and subsequenty enters the heating zone and is reacted therein.

In the nuclear reactor, the helium must always be available as a cooling fluid for the nuclear fission process. This helium contains traces of radioactive material. For this reason, the helium must not enter the gas produced by the cracking of hydrocarbons. Besides, dangerous quantities of the product gas must not enter the helium system.

During the operation of the nuclear heater, an occurrence of leaks in the reaction tubes must be expected to occur from time to time. In case of a leak in one tube, a shutdown of the entire reactor would be undesirable. To avoid this, the tubes are combined in groups, which can be opened and closed independently of each other. Each group of tubes has a common conduit for feeding the feedstock and a common conduit for discharging the product gas and these feed and discharge conduits are separate from the respective conduits for the other groups. In case of a leak in one tube, the group including this tube and consisting, e.g., of 3 tubes, is closed whereas the other reaction tubes continue to operate without a disturbance. Because a tubular reactor may include, e.g., 30 tubes to about 300 tubes and more, the closing of a small number of tubes means virtually no loss of capacity.

A large number of valves which must be reliable in operation are required to enable a closing of tubes in groups. For this reason these valves are disposed in the reactor in a region which is outside the heating zone and for this reason assumes temperatures not in excess of 450°–550° C. The reactor is designed so that its tubes are partly disposed inside the heating zone and partly outside the heating zone so that the costs of the valves may be minimized as they are disposed in a region of the reactor where the temperatures are relatively low.

The heat exchange between the product gas and the feedstock enables in a simple manner a discharge of the product gas at temperatures of 450°–550° C. If the product gas were cooled, e.g., in a waste heat boiler, this would involve a disproportionately higher expenditure because the water-water vapor system would also have to be divided into subunits for reasons of safety.

DESCRIPTION OF THE DRAWING

Illustrative embodiments of the reactor will be explained with reference to the drawing, in which.

DESCRIPTION

Figure 1:
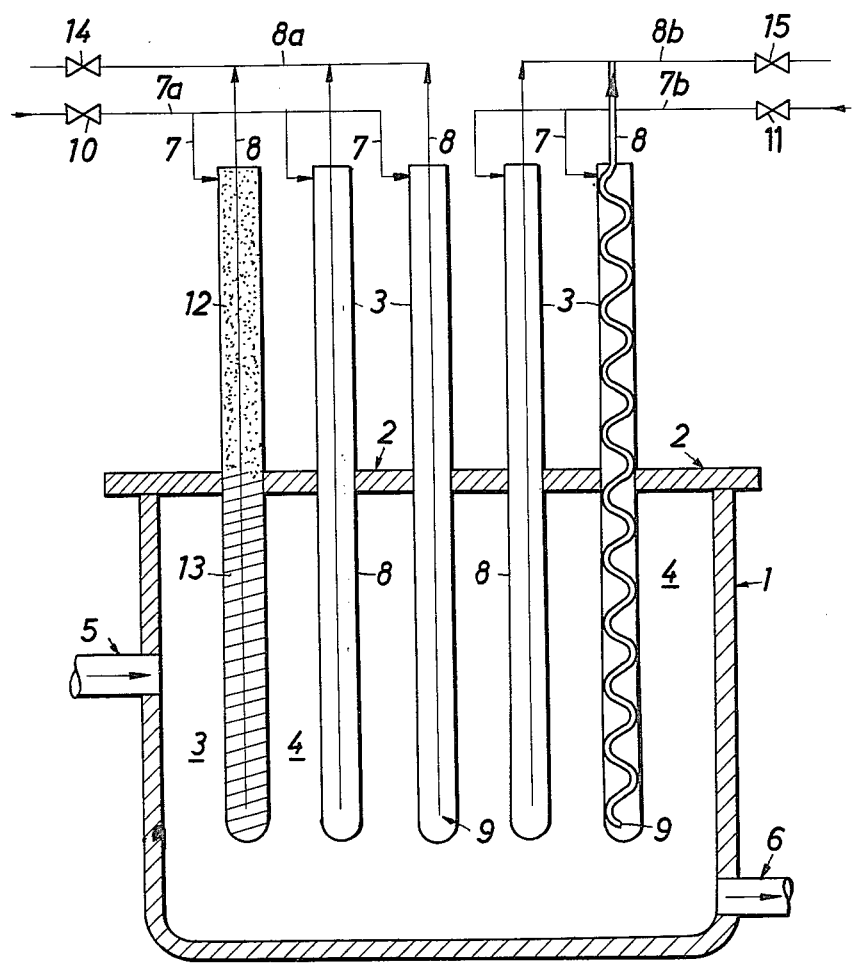
FIG. 1 is a diagrammatic vertical view, partly in section, showing the reactor of the invention.

The reactor shown in FIG. 1 comprises a housing 1, which contains a cover plate 2 and a plurality of tubes 3. The tubes extend with part of their length into the heating zone 4. The other portion of the tubes is disposed outside the heating zone, as shown in FIG. 1. The heating fluid for the heating zone 4 enters the heating zone through the inlet 5 and leaves the heating zone at the outlet 6. Fixtures, not shown, are provided in the heating zone 4 of the reactor and cause the hot gas to flow adjacent to the tubes so that it can deliver to said tubes as much heat as possible before the gas is discharged at 6.

The tubes 3 have an elongated cylindrical shape and within the heating zone 4 are completely closed, also at their lower end. Each tube is provided with a conduit 7 for feeding feedstock to be reacted and a conduit 8 for discharging product gas. The discharge conduit 8 extends in each tube close to the lower end thereof and near said lower end has an inlet opening 3.

The discharge conduits 8 extend within the tubes 3, e.g., in a zigzag or helical configuration, as is illustrated for one tube. Reaction tubes of this kind are described in U.S. Pat. No. 3,713,784.

That portion of each tube which is disposed in the heating zone 4 is filled with catalyst material 13 which surrounds the discharge conduit 8. This material is represented by a hatched area for one tube. That portion of each tube which is disposed outside the heating zone is filled with inactive filling material 12 in order to improve the heat transfer from the discharge conduit 8 to the interior of the tube.

Mixed feedstocks flow through manifolds 7a and 7b into the feed conduits 7 and from the latter into the several tubes 3. The manifolds 7a and 7b are adapted to be opened and closed independently of each other by valves 10 and 11. The mixed feedstocks consist, e.g., of methane and water vapor in a molar ratio of 1:1.2 to 1:7. Methane may be replaced, e.g., by a rich gas, which contains a major portion of methane and in addition contains hydrogen, carbon oxides and higher hydrocarbons. Such rich gas may be produced in known manner from naphta and water vapor by a catalytic cracking of naphtha in the presence of water vapor over nickel catalysts at temperatures of 300°–500° C.

The mixed feedstocks are preheated to about 350°–450° C by means not shown before it enters the tubes 3 and then flows first through the upper part of the tubes. This upper part contains an inactive, gas-permeable packing. The packing may consist, e.g., of heat-resisting ceramic elements. The mixed feedstocks are preheated further as they flow through the packing and are at a temperature of 450°–550° C when they have reached the level of the cover plate 2 in each tube. On that level the mixed feedstocks contact the catalyst material 13 so that, the endothermic reaction of the hydrocarbons with water vapor to form CO, $CO_2$, and $H_2$ begins. The heat of reaction which is required is supplied by hot helium which is supplied from the nuclear reactor to the heating zone 4. At the lower end of the tubes 3, near the inlet opening 9 for the conduit 8 for discharging the product gas, the gas is at temperatures in the range of 700°–1000° C. As this product gas flows back in the discharge pipe 8, it supplies additional heat to the catalyst material 13 and also to the packing 12 in the manner described hereinbefore. The discharge pipes 8 open at their upper ends into discharge manifolds 8a and 8b. At that point, the product gas is at a temperature of about 450°–550° C. The discharge manifolds 8a and 8b can be opened and closed independently of each other by valves 14 and 15.

Figure 2:
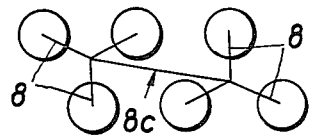
FIG. 2 is a top plan view showing the combination of reaction tubes in groups.

The gas pressure in the tubes 3 is in the range of 5 kg/cm$^2$ to about 80 mg/cm$^2$, preferably about 10–60 kg/cm$^2$. Under this high pressure, leaks in the tubes cannot be entirely eliminated in continuous operation. In such case it must be prevented, above all, that substantial quantities of the heating helium, which contains radioactive material from the nucler reactor, enter the product gas conduits 8, 8a and 8b and that dangerous quantities of the product gas enter the helium. For this reason, the tubes are combined in groups, each of which comprises a small number of tubes and can be opened and closed separately from the other tubes. FIG. 1 shows two groups of two and three tubes, respectively. FIG. 2 is a top plan view showing a group of six tubes, which contain product gas discharge pipes 8, which open into a manifold 8c, which can be closed by means which are not shown. In case of a leak in one of the tubes, the entire group of tubes is closed whereas the other tubes of the reactor are not rendered inoperative so that the operation of the reactor can be continued with an only slightly reduced capacity. A group which can be separately closed may include any desired number of tubes. For instance, such group may consist of one to six tubes. Each group is provided with valves for closing the feed manifold 7a or 7b and the associated feed conduits 7 are sufficiently large in diameter and are arranged so that they can be used to fill the packing and catalyst material from said tubes.

Instead of the above-mentioned inactive filler 12, a nickel catalyst of high activity may be used in the upper part of the tubes. Such nickel catalyst may consist, e.g., of a rich gas catalyst. Suitable catalysts contain 40–70% by weight of nickel on a support such as magnesium silicate. Part of the mixed feedstocks consisting of methane and water vapor are now cracked in the upper portion of the tubes at temperatures of about 400°–550° C in an endothermic reaction to form CO, $CO_2$, and $H_2$. The remainder of the feedstocks is cracked in the lower part of the tubes in the manner described hereinbefore. The use of a catalyst of high activity in the upper part of the reaction tubes enables a higher throughput rate per tube and results in an improved heat exchange with the product gas because the endothermic cracking reaction consumes heat.

What is claimed is:

1. Reactor for reacting a gaseous mixture of gaseous or vaporized hydrocarbons with water vapor to produce a product gas of carbon monoxide and hydrogen-containing gases at temperatures above 700° C and under pressure of 5–80 kg/cm$^2$ comprising a heating zone and reaction tube means receptive of a heating fluid which consists of a gas at a temperature above 800° C for indirectly heating same in the heating zone comprising a plurality of tubes each having a first portion extending into the heating zone and surrounded by the heating fluid in a heating zone, a second portion positioned outside the heating zone, feed conduit means for feeding the gaseous mixture therein and discharge conduit means for discharging product gas, each reaction tube having a closed end within said heating zone, each discharge conduit means extending longitudinally through the first and second portions of its respective reaction tube almost to the tube end and being open at its end within said reaction tube, a gas permeable material disposed in the second portion of each tube in the annular space around the discharge conduit means to promote heat transfer and catalyst material disposed in the first portion of each tube in the annular space around the discharge conduit means whereby the gaseous mixture to be reacted is fed to each reaction tube, flowing therethrough, through the gas permeable material, undergoing reaction therein to form the product gas which then flows through the discharge conduit means contercurrent to the direction of flow through the gas permeable material.

2. Reactor of claim 1 wherein the feed and discharge conduit means of the reaction tube means are adapted to be open and closed individually or in groups independently of the other conduit means.

3. Reactor of claim 1 wherein the first portion of the reaction tube contains nickel catalyst material and the second portion contains inactive filler.

4. Reactor of claim 1 wherein the second portion of the reaction tubes are arranged in a steam generator.

5. Reactor of claim 1 wherein a nickel catalyst of high activity is contained in the second portion of the reaction tube.

6. In combination, a nuclear reactor, means for indirectly transferring the reactor heat to a gas under pressure, and reactor means for utilizing the heated gas for heating the endothermic reaction at a pressure of 5–80 Kg/cm$^2$ of a gaseous mixture containing hydrocarbons and water vapor to produce a product gas mainly consisting of hydrogen and carbon monoxide, said reactor means comprising a heating zone, a plurality of reaction tubes each having two portions, the first portion positioned outside said heating zone and having an inlet for said gaseous mixture and the second portion extending into said heating zone so as to be surrounded by the heating gas and having a closed end within said heating zone, a discharge conduit within each tube for discharging product gas and extending substantially centrally through the first and second portions of the tube almost to the tube end, being open at its end within said reaction tube, means for forcing gaseous reactants to flow through the first and second portions of the tubes annularly to the end and then to discharge through said discharge conduit, gas permeable material disposed in each tube in the annular space around the discharge conduit in the first portion for promoting heat transfer and gas permeable material consisting of a granular nickel catalyst in each tube in the annular space around the discharge conduit in the second portion, whereby the gaseous reactants are indirectly heated in the first portion of the tubes by the product gas and in the second portion by the heated gas from the nuclear reactor in the heating zone whereby the gaseous mixture to be reacted is fed to each reactor tube, flowing therethrough, through the gas permeable material, undergoing reaction therein to form the product gas which then flows through the discharge conduct means contercurrent to the direction of flow through the gas permeable material.

7. The apparatus of claim 6, wherein the gas permeable material in the first portion of the reaction tubes above the catalyst materials within the reaction zone contain a nickel catalyst of high activity, whereby reaction commences prior to reaching the reaction zone.

8. The apparatus of claim 6, wherein the reaction tubes above the catalyst materials within the reaction zone contain a nickel catalyst of high activity, whereby reaction commences prior to reaching the reaction zone.

* * * * *